(12) United States Patent
Chura

(10) Patent No.: US 9,591,831 B2
(45) Date of Patent: Mar. 14, 2017

(54) PET SELF-GROOMING PASS-THROUGH TUNNEL

(76) Inventor: Mike Chura, Winnipeg (CA)

( * ) Notice: Subject to any disclaimer, the term of this patent is extended or adjusted under 35 U.S.C. 154(b) by 542 days.

(21) Appl. No.: 13/406,559

(22) Filed: Feb. 28, 2012

(65) Prior Publication Data

US 2012/0222627 A1 Sep. 6, 2012

Related U.S. Application Data

(60) Provisional application No. 61/447,967, filed on Mar. 1, 2011.

(51) Int. Cl.
*A01K 13/00* (2006.01)

(52) U.S. Cl.
CPC .......... *A01K 13/004* (2013.01); *A01K 13/002* (2013.01)

(58) Field of Classification Search
CPC ..... A01K 13/00; A01K 13/004; A01K 13/002
USPC ........ 119/612, 621, 622, 625, 627, 652, 661
See application file for complete search history.

(56) References Cited

U.S. PATENT DOCUMENTS

| | | | | |
|---|---|---|---|---|
| 2,865,329 A | * | 12/1958 | George | A01K 13/002 119/622 |
| 2,976,841 A | * | 3/1961 | Scheffer | A01K 13/002 119/622 |
| 4,926,796 A | * | 5/1990 | Leopold | A01K 13/004 119/602 |
| 4,938,169 A | | 7/1990 | Barmakian | |
| 5,458,088 A | | 10/1995 | Owens | |
| 5,755,183 A | * | 5/1998 | Udelle | A01K 13/004 119/622 |
| 7,444,959 B2 | * | 11/2008 | Hensley | A01K 13/004 119/622 |
| 2006/0026783 A1 | * | 2/2006 | McKay | A01K 13/002 15/104.94 |
| 2007/0039558 A1 | | 2/2007 | Hensley | |

* cited by examiner

*Primary Examiner* — Thien Thanh Pham
(74) *Attorney, Agent, or Firm* — Global Intellectual Property Agency, LLC; Daniel Boudwin

(57) ABSTRACT

Disclosed is a pet grooming device that allows a pet to groom itself by passing through an annular tunnel having a plurality of grooming elements disposed therewithin. The tube-shaped device comprises an elongated tunnel having a first and second opening with wire grooming bristles attached within its interior. The pet is able to walk through the opening and as the animal passes through the device wire bristles brush the pet's hair in the natural direction, from head to tail. The distance the animal must pass through while traversing the device ensures that the animal's fur is sufficiently engaged by the bristles to promote a thorough grooming with each pass through the device, while a pathway free of grooming elements is provided for the pet to walk through the tunnel with ease and less trepidation. A barrier crossing and stand alone embodiment are disclosed, along with a method of construction.

5 Claims, 3 Drawing Sheets

PET SELF-GROOMING PASS-THROUGH TUNNEL

CROSS REFERENCE TO RELATED APPLICATION

This application claims the benefit of U.S. Provisional Application No. 61/447,967 filed on Mar. 1, 2011, entitled "Cat Self-Groomer."

BACKGROUND OF THE INVENTION

Field of the Invention

The present invention relates to pass-through self-grooming devices for the purpose of brushing the fur of a domestic animal. The present invention is particularly useful for grooming cats and small dogs, wherein passageway through the device provides a means to remove loose fur and groom the pet. More specifically, the present invention provides a means for an animal to groom itself as it passes through a grooming tunnel, minimizing the amount of interaction that is required by the pet owner in the grooming process. The device further provides a unique interior structure that facilitates the pet's ability to easily traverse the tunnel without navigating the attached grooming elements, reducing hesitation and eventual pass-through confidence.

Description of the Prior Art

Pet allergies are a problem for many individuals. Humans exhibit allergic reactions to many household pets such as birds, hamsters, rabbits, mice, gerbils, rats, and guinea pigs, with allergies to dogs and cats being the most common. Cat allergies are more prevalent than dog allergies. Allergies can cause skin irritation, an itching sensation around the eyes, nose and throat, watering of the eyes, sneezing, and congestion. Pet allergies can also cause wheezing and bronchial constriction in those with asthma. Interestingly, it is not the pet's hair which is the root cause of allergies. Rather, humans are allergic to certain animal proteins that are excreted by animals in either their saliva or dander, which typically attaches to the animal's hair. The animal's fur also commonly harbors other allergens such as pollen, dust or mold spores. Fur that is shed onto the floor or on furniture may present a problem for those with allergies and shed fur is also unsightly. Regular grooming of an animal can reduce the amount of loose fur and collected allergens that are on the animal, as well as reduce the amount of fur that ends up on the floor or furniture.

Despite being inherently self grooming animals, cats in particular are known to continually shed regardless of their own attentiveness and upkeep. No amount of licking or cleaning performed by a cat completely eliminates the amount of shed fur. Furthermore, when a cat is left to groom itself, the cat has a tendency to develop hairballs, which owners find left on the floor for clean up. Cats therefore require grooming assistance, which a pet owner may not necessarily have time to afford the pet in order to adequately brush or groom consistently as he or she should.

The present invention comprises a pet grooming device that allows the pet to groom itself without help from its owner. The device is a pass-through tunnel that employs a plurality of grooming elements within its interior. Along the base of the tunnel is an open channel of removed grooming elements to allow the pet to easily enter the tunnel without otherwise stepping onto the upstanding grooming elements. This design promotes increased comfort for the pet and increased willingness to enter the tunnel passageway. The device comprises a unitary, flexible sheet of brushing bristles that rolls to form a tube-shape. The tube-shaped device comprises a first and second opening, along with grooming elements attached to the interior of the tube. The interior of the device features a walking path that is free from bristles, as mentioned, such that the animal may step through the device without hurting its paws. A pet is able to walk through the openings of the tube and have its fur brushed as it makes its way from the first to second opening. As the animal passes through the device, the grooming elements brush loose hair in the natural direction from head to tail. The elements contact the pet along its top, sides and underbelly for complete coverage. The distance that the animal must pass through when traversing the device ensures sufficient engagement of the fur by the grooming elements, promoting a thorough grooming of the animal with each pass. Embodiments of the device include a boundary crossing tube, such as one being mounted in front of a pet door or boundary crossing, as well as a standalone embodiment that is supported by a stationary platform. Both the standalone and boundary crossing embodiment are capable of assembly from a planar configuration, which facilitates storage and shipping.

A number of different pass-through grooming pet devices have been patented and published in the prior art. For example, U.S. Pat. No. 5,458,088 to Owens describes an arched grooming portal designed to be incorporated into a pet door. As the animal moves from room to room through the pet door, the pet must use the portal covered pet door to gain access to the next room. The portal brushes the animal each time it enters or exits the portal. The device is arched similar to a horseshoe and incorporates grooming bristles, which are attached to the inner arch of the device. When the animal passes through the portal, the bristles gently brush the animal's sides, head and back. The present invention provides a unique pass-through device that has the flexibility to be installed in either an entryway or as a standalone structure. Since the Owens device is horseshoe shaped with no underside grooming elements, the underbelly of the animal remains un-brushed.

U.S. Pat. No. 4,938,169 to Barmakian also describes a grooming portal device that is designed to be incorporated into a pet door. As the animal moves from room to room, the device allows ingress and egress of an animal through the portal. The portal comprises several triangular-shaped flaps that completely cover the portal, with the flap ends converging towards the center of the portal. The animal must push past these flaps in order to get through the portal. Both sides of the portal flaps are covered with small gripping bristles designed to grab at loose fur, so that when the animal passes through the device, either coming or going, grooming of the animal will occur. As the animal moves through the portal, the bristles engage the animal's fur, brushing the fur in the natural direction of the hair—i.e. brushing the hair from the nose of the animal to the tail. The Barmakian device provides little to no visual clearance through the passageway, leading to trepidation in the pet as to how to navigate through the portal. Further, the flaps operate in a single direction, which do not readily allow the animal to back up once engaged in the portal. This arrangement can lead to injury if the animal stops, gets frightened and attempts to go backward. The triangles would dig into the animal and cause injury thereto.

The Owens and Barmakian patents both describe pass-through devices for the purpose of grooming an animal. But both devices exhibit the same shortcoming in the devices. These patents describe portal devices designed to attach to a pet door, so as the pet passes through the portal, from room to room, the portal device grooms the animal. The primary disadvantage related to these devices is the limited amount of time the animal's fur is in contact with the grooming mechanisms of each as the animal passes through the device. Each patent describes a portal device that fits inside pet door parameters. The depth of these devices is limited to the depth of the doorway or barrier. The animal could quickly bolt through the device, limiting the amount of contact the bristles have with the animal's fur. The present invent requires the animal to pass through the device for a longer distance in order to traverse the length of the device, allowing the grooming elements to have significantly greater contact with the animal's fur. The length of the present invention ensures that the animal's fur is sufficiently engaged to promote a thorough grooming with each pass. Since the present invention is a pass-through device, if it is used on a doorway in which the animal must transverse frequently, the self-grooming process provided by this device can become a regularly practiced, daily occurrence, providing thorough grooming and dander removal from the pet. The present invention provides embodiments for a barrier passageway and a standalone structure, each of which provides the same functionality, while the doorway embodiment provides function and ingress/egress into and from a room.

Other forms of self-grooming devices exist in the prior art and are considered relevant to the present invention. U.S. Pat. No. 7,444,959 to Hensley describes a stationary, upstanding device with multiple brushes for grooming and massaging a cat. The brushes are oriented such that at least one brush is in a horizontal position and at least one brush is oriented in a vertical position. The grooming brushes grip, extract, capture and retain loose fur when the animal rubs against the bristle covered surfaces. A cat will approach the device and rub their body against the bristles to satisfying itches. Unbeknownst to the cat, while the feline is satisfying his or her itches, the device simultaneously will brush the animal's fur and remove loose hair.

The disadvantage to stationary devices such as the Hensley device is that the animal is unlikely to rub their entire body on the grooming brush implement of the device. Rather, the animal is more prone to merely use the device for satisfying an itch in one small area of the pet's body. A stationary device provides no incentive to the animal to groom his or her entire body against the device. Conversely, the present invention implements a pass-through design that promotes grooming of the whole animal. When the device serves as the only means for the animal to get from one room to another, and there is an incentive for the animal to pass through the device—such as food or a favorite sleeping area on the other side of the device, the animal will transverse the grooming portal as described by the present invention. As the animal emerges from the other end of the present invention, the animal will be nicely groomed. Continual passes over time ensure the pet becomes accustomed to the device and facilitates improved grooming of the pet with minimal owner interaction.

In light of the devices in the prior art and their inherent differences, it is submitted that the improvements embodied by the present invention substantially diverge from the design elements of the prior art, and consequently it is clear that there is a need in the art for an improvement to existing animal self-grooming pass-through devices. In this regard the instant invention substantially fulfills these needs.

SUMMARY OF THE INVENTION

In view of the foregoing disadvantages inherent in the known types of existing animal self-grooming pass-through devices now present in the prior art, the present invention provides a new pass-through design that promotes sufficient contact between grooming elements of the device and the animal's fur, unbeknownst to the animal as it traverses through the device. The device encourages animals to groom themselves at any time utilizing a standalone embodiment or provide a barrier passageway grooming embodiment that facilitates grooming during ingress/egress into a dwelling.

It is therefore an object of the present invention to provide a new and improved animal self-grooming pass-through device that has all of the advantages of the prior art and none of the disadvantages.

It is another object of the present invention to provide an animal self-grooming device that brushes all sides of the animal while retaining loose animal fur and dander as the animal passes through the device.

Another object of the present invention is to provide an animal self-grooming device that is provided in two contemplated embodiments, a first that is a standalone structure, and a second that is adapted to be placed onto an animal entryway hole.

A further embodiment of the present invention is to provide an animal self-grooming pass-through device that is easily traversed by the animal and rapidly builds animal confidence with regard to its use, as the grooming elements are situated so as to allow ease of ingress into and passageway through the tunnel.

Yet another object of the present invention is to provide an animal self-grooming device that can be disassembled into planar components, facilitating ease of shipping and storage.

A final object of the present invention is to provide an animal self-grooming device that reduces the amount of human interaction that is required in the process of grooming an animal.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
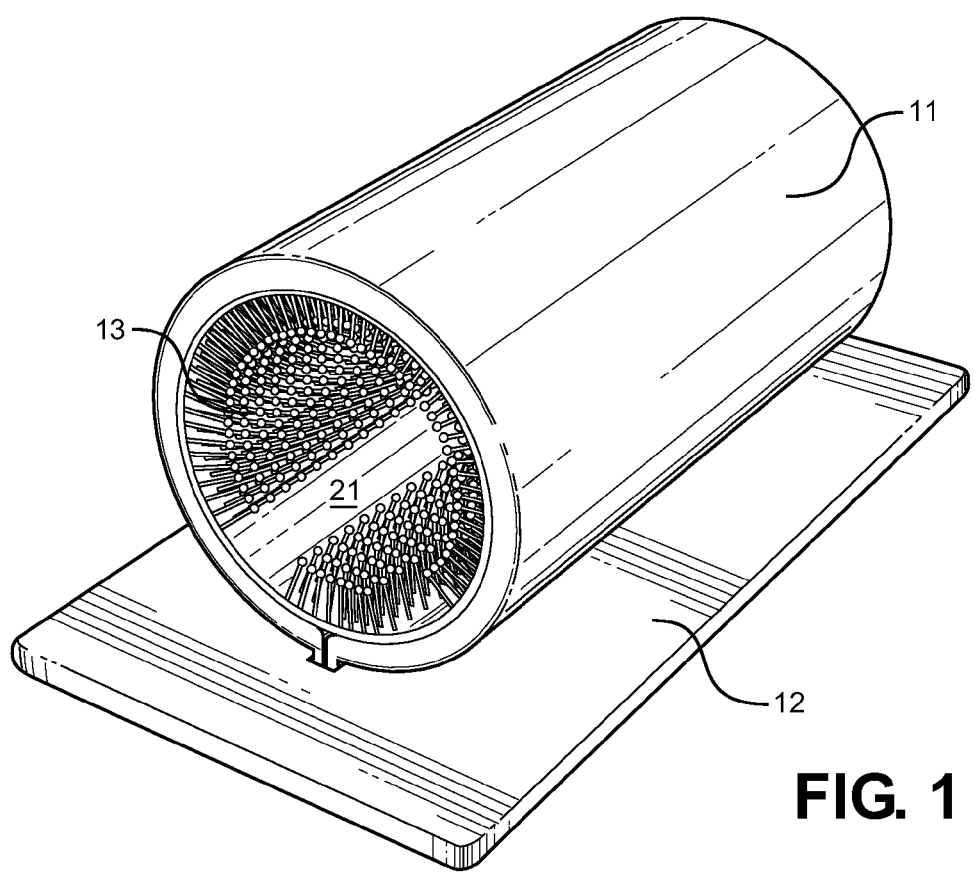
FIG. 1 is a perspective view of the standalone embodiment of the present invention.

Reference is made herein to the attached drawings. Like reference numerals are used throughout the drawings to depict like or similar elements of the cat self-grooming pass through device. For the purposes of presenting a brief and clear description of the present invention, the preferred embodiment will be discussed as used for providing a passageway that allows a pet animal to groom itself as it passes through the device, mounted to either an entryway or as a standalone structure. The figures are intended for representative purposes only and should not be considered to be limiting in any respect.

Referring now to FIG. 1, there is shown an overhead perspective view of the standalone embodiment of the present invention in a deployed state. This embodiment of the device comprises a tubular passageway or tunnel 11 with a plurality of internal grooming elements 13 disposed therewithin, adapted to allow a pet animal pass through the length of the passageway for the grooming elements to comb over the pet's fur for removal of loose hair thereon. The passageway 11 includes a first and second opening on either ends to allow entrance or exit from either end. The passageway is supported by a planar support structure or base 12, which allows the standalone embodiment to be positioned anywhere within a room or dwelling for the animal to utilize. Within the passageway, inwardly pointing and deformable grooming elements 13 are disposed to contact the pet along its side, top and underside. A path 21 devoid of grooming elements provides a smooth pathway for which the animal to walk upon, wherein the grooming elements do not pose a nuisance or impedance to easily traversing or entering the tunnel. The pathway increases the pet's willingness to enter the tunnel 11 with little trepidation, as the elements will not hurt its paws as it enters and walks therethrough. A strip of grooming elements 13 is preferably situated along the middle of the pathway 21 to establish two discrete walking paths for the purpose of brushing the underside of the animal as it walks through the device. The encircling grooming elements 13 along the interior surface of the tunnel are adapted to brush the top and sides of the animal. The grooming elements 13 are preferably deformable bristles or brush elements, such as those known in the art for grooming brushes and devices. Any commonly utilized grooming element known to one skilled in the art is contemplated for use within the disclosed pass through device.

The tubular passageway 11 is supported by a base platform 12 such that the assembly remains stable and stationary during use. To facilitate use on laminate or hardwood floors, suction cups are placed along the bottom surface of the platform 12 to prevent movement. Similarly, a high friction lower surface may be utilized for the same purpose. The surfaces of the tube 11, base structure 12 and pathway 21 may be a carpeted material or an abrasive material, such that a pet animal may utilize the surfaces of the devices as a scratching post or similar means to reduce claw length. In this way, as the animal walks through or on the device, its claws may be filed down accordingly.

In use, an animal enters the device from the first or second end of the tunnel 11, and exits from the opposite end. While the animal traverses through the device, the grooming elements 13 brush and massage the animal. The device brushes the animal's fur in a natural direction—from head to tail. The grooming elements 13 are of sufficient length and are provided in such density along the interior of the device such that the elements 13 are highly effective for gripping and retaining of loose animal fur, and for making adequate contact with the animal for that goal. Since the interior of the device is lined with these grooming elements, the whole animal is brushed with each pass through of the device, including the animal's back, sides and underside. The pathway 21 facilitates comfort and ease of passage, while the circumferential coverage of grooming elements contacts nearly all surfaces of the animal as is passes therethrough. The goal is to provide a device that grooms a majority of the animal, while providing a device that an animal can be easily accustomed to and utilize readily.

Figure 2:
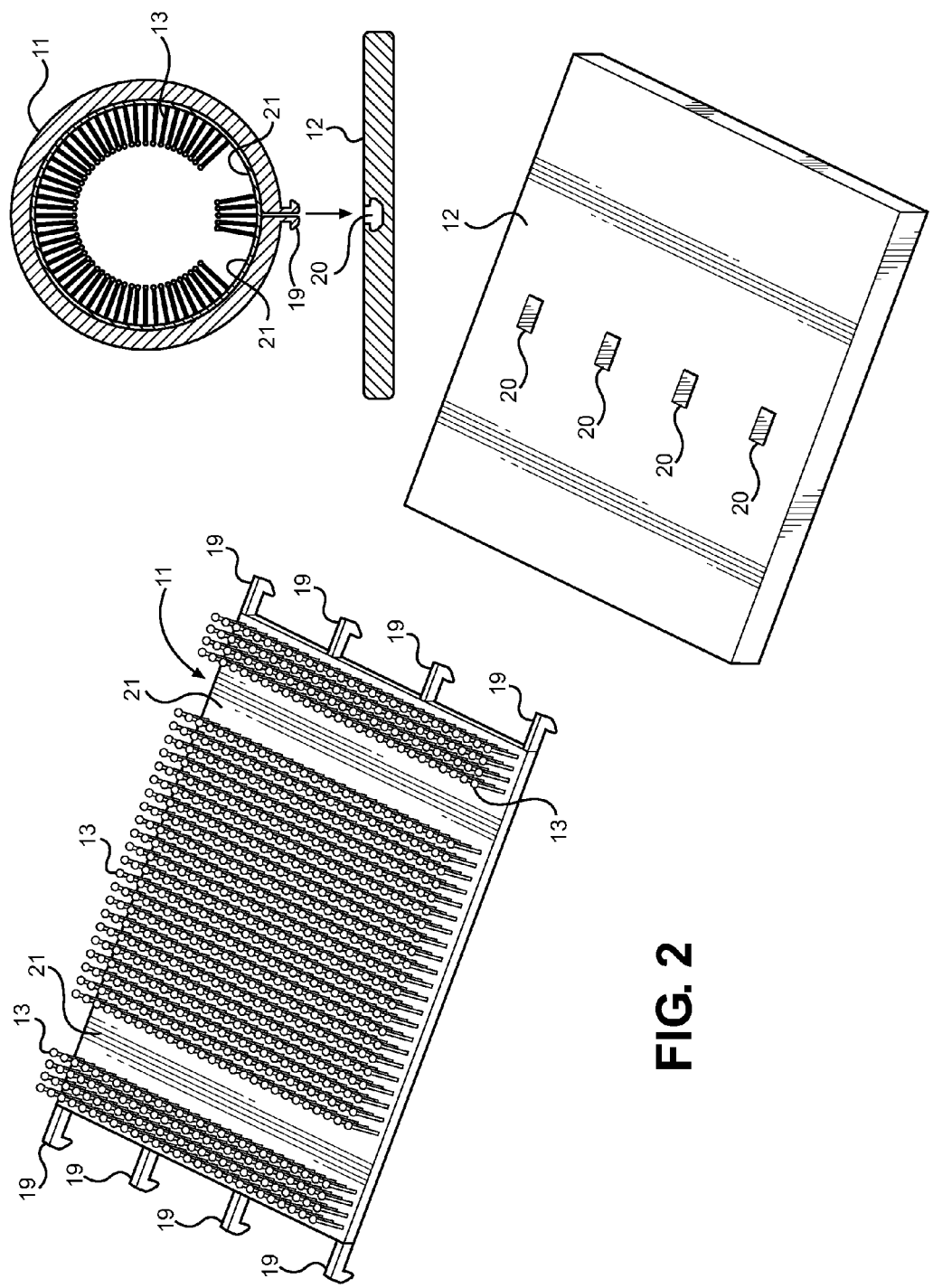
FIG. 2 is a view the standalone embodiment of the present invention being assembled from planar elements, wherein its construction is visualized.

Referring now to FIG. 2, there is shown the construction of the standalone embodiment of the present invention. This embodiment is preferably of two-piece construction, wherein the tunnel 11 comprises a rolled planar surface having grooming elements 13 providing along a first surface, the tunnel outer surface along the planar surface second surface, and attachment means 19 disposed along opposing edges thereof. The planar surface is a flexible sheet of material that provides a support for the grooming elements and a thickness for the tunnel. Its overall length determines the diameter of the tunnel 11, wherein planar starting shape of the tunnel and base platform 12 allows improved storage and shipping of the overall assembly when not in use. The assembly is preferably assembled by rolling the planar surface into a tunnel shape 11, joining opposing edges and said attachment means 19. These attachment means 19 adjoin with corresponding attachment locations 20 on the base platform 12. These elements are contemplated as a mortise and tenon joint, wherein the tunnel provides radially-projecting inserts 19 that enter into notches 20 in the base platform. This allows a male-female carpentry-style joint that secures the assembly in a working position. The tendency of the tunnel to unravel keeps pressure on the inserts 19 within the notches 20, improving the quality of this joint. Other contemplated joints include finger joints and dovetail joints.

Figure 3:
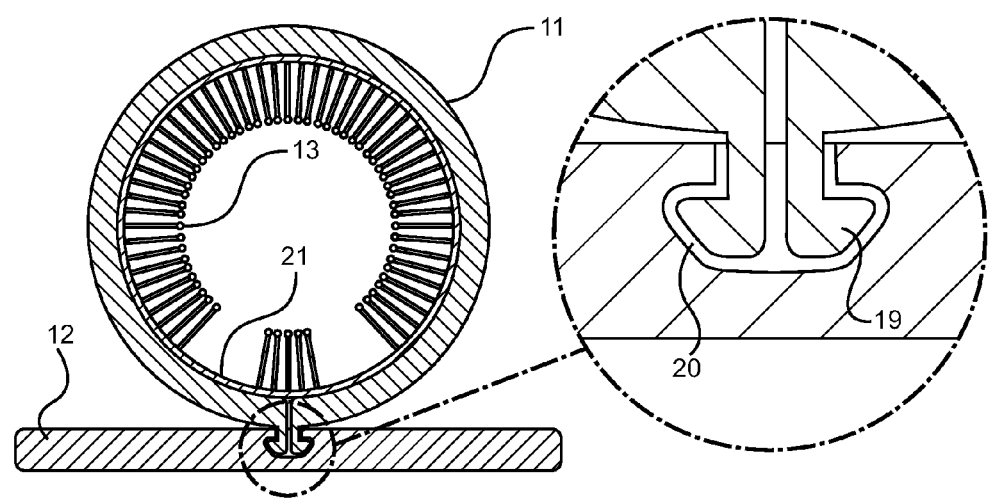
FIG. 3 is a cross section view of the standalone embodiment of the present invention.

Referring now to FIG. 3, there is shown cross sectional end view of the standalone embodiment present invention in a working position, wherein its elements are assembled and the device is ready for use. The animal passes through the center of the tubular-shaped tunnel 11 while utilizing the central walking path or paths 21, and contacts the grooming elements 13 as it passes therethrough. The device is assembled from a flexible sheet having a plurality of grooming element bristles thereon, which is rolled to form a hollow tubular-shaped passageway 11. The connection of the passageway 11 and the base platform 12 comprises a mortise and tenon joint, wherein inserts 19 are positioned into notches in the base platform 12. Mounting the tubular-shaped column to the base board in this fashion stabilizes the device so that it does not move or roll. Rolling or translational movement could scare an animal and prevent it from ever wanting to use the device.

Figure 4:
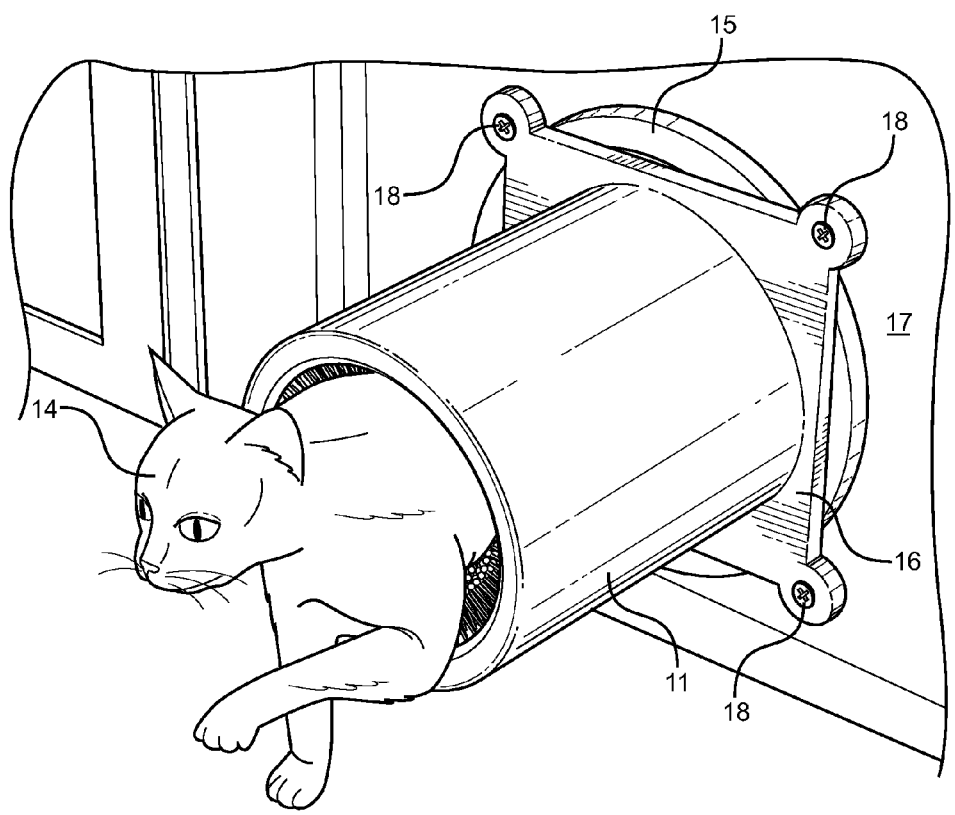
FIG. 4 is a perspective view of the entryway embodiment of the present invention mounted over a pet door, depicting how a cat could utilize this embodiment of the device.

Referring now to FIG. 4, there is shown a perspective view of the doorway embodiment of the present invention, which is attached over a pet door 15 and in use by a cat 14. This embodiment of the device mounts over a pet door 15 and acts as an elongated grooming tunnel which is utilized each time the pet enters or exits a room. A pet door allows animals to pass from room to room even when the door between those rooms is closed. The present invention is capable of being mounted over a pet door 15 so as an animal 14 travels from one room to another the animal 14 is contacted by the grooming elements and thoroughly cleaned of loose fur and debris. The pet door embodiment of the present invention implements a similar tubular structure 11, but incorporates a door or wall mounted base 16 attached an end of the tunnel 11 adapted to abut against an upstanding wall surface. The wall mounting base 16 provides a centrally located through-hole that aligns with the interior of the tunnel to facilitate the animal's passage through the tunnel and through the wall hole. If so desired by a pet owner, the device can be installed over a pet door 15. The wall mounting base 16 of the device can be secured to a door 17 at each of the four corners using an appropriate fastening attachment means 18. The installer's choice of attachment means 18 includes any common fasteners such that the device is removably attached to a pet door 17 and supporting surface therearound.

The doorway embodiment of the present invention may similarly be constructed of otherwise planar structures, similar to the standalone embodiment. The wall mounted base 16 is detachable from the tunnel 11, which itself is a rolled structure that is formed of a flat sheet of material having grooming elements disposed thereon. The rolled tunnel 11 is attached together at its ends, forming a cylindrical shape, while a similar mortise and tenon joint may be utilized at the base 16 and tunnel 11 interface. This provides an assembly that is easily deconstructed or shipped using a smaller volume, which may be desirable for storage or transport. Alternatively, both embodiments of the present pass-through grooming device may be constructed of a unitary structure. Both embodiments comprise of a passageway having a walking path and a plurality of grooming elements to remove loose fur and debris from all surface of the given pet.

To initiate the use and acclimate the pet to the device, it may be necessary to first manually groom the pet with a brush having similar grooming bristles. Once the pet is familiar with the feeling of being brushed, the pet is gently enticed through the tunnel to gradually teach the animal how to enter and traverse through the device. The training process may take some time, as an animal may initially be hesitant or resistant to entering or completely passing through the tunnel. However, with the proper incentive, such as a treat or positive reinforcement, the animal will develop a positive association with the device. The process of self-grooming by using the present invention will become a regular, daily occurrence. The device is desired to be useful for animals of all sizes and shapes, and not limited to use by cats only; small dogs and other animals with fur could also be trained to use the device on a regular basis.

In use, the pet owner should clean the device regularly by extracting the collected fur from the grooming element bristles. Improper or irregular cleaning of the device can lead to fur build up. Fur will eventually collect around the base of the elements, limiting the effective length of the cleaning element bristles or reducing their elasticity, which in turn decreases the overall efficacy of the device. The structure of the tunnel and supporting surfaces may be of any desirable material. It is contemplated to include one such surface that employs an abrasive, which can expand the utility of the present device by allowing its surfaces to act as a scratching post or claw filer. Another contemplated material includes carpeted surfaces that include a substrate to support the interior grooming elements during use.

Overall, the present invention provides a new and novel animal self-grooming pass-through device. In light of the aforementioned prior art and the given disclosure, it is herein submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pass-through animal self-grooming device, comprising:
    an elongated, cylindrical tunnel having a first and second end, an interior volume, and an interior surface;
    said interior surface having a plurality of elongated grooming elements disposed thereon and pointed radially inward;
    said tunnel is a rolled flexible sheet of material;
    said rolled flexible sheet of material having a first and second surface; said plurality of elongated grooming elements are disposed along a length of said first surface, wherein two opposing edges of said rolled flexible sheet of material abut against one another to form said tunnel, wherein said first surface of the rolled flexible sheet of material defines said interior surface;
    each of said two opposing edges further comprising at least one hook;
    said tunnel has a pathway positioned along a lower portion of the interior surface, said pathway includes a pair of walking paths devoid of the plurality of elongated grooming elements, wherein said pair of walking paths are separated from one another by a strip of the plurality of elongated grooming elements;
    a base platform for supporting the tunnel and providing a standalone assembly;
    the base platform including at least one notch aligned with and corresponding to the hooks of said two opposing edges, said hooks configured to be inserted into the at least one notch;
    wherein said pair of walking paths configured to allow a pet to walk through the interior volume of said tunnel such that said plurality of elongated grooming elements contact a top side, a left side, a right side, and an underside of said pet as it traverses therethrough.

2. The device of claim 1, wherein said base platform further comprises a high friction lower surface to prevent sliding movement of said device.

3. The device of claim 1, wherein said interior surface further comprises an abrasive material such that said animal may file down its claws as it passes through or climbs onto said device.

4. A pass-through animal self-grooming device, comprising:
    an elongated, cylindrical tunnel having a first and second end, an interior volume, and an interior surface;
    said interior surface having a plurality of elongated grooming elements disposed thereon and pointed radially inward;
    said tunnel is a rolled flexible sheet of material;
    said rolled flexible sheet of material having a first and second surface; said plurality of elongated grooming elements are disposed along a length of said first surface, wherein two opposing edges of said rolled flexible sheet of material abut against one another to form said tunnel, wherein said first surface of the rolled flexible sheet of material defines said interior surface;

each of said two opposing edges further comprising at least one hook;

said tunnel has a pathway positioned along a lower portion of the interior surface, said pathway includes a pair of walking paths devoid of the plurality of elongated grooming elements, wherein said pair of walking paths are separated from one another by a strip of the plurality of elongated grooming elements;

a wall mounted base attached to the second end of said tunnel for abutting against an upstanding wall, said base platform has a through-hole that aligns with the interior volume of the tunnel and a hole on said upstanding wall;

the wall mounted base including at least one notch aligned with and corresponding to the hooks of said two opposing edges, said hooks configured to be inserted into the at least one notch;

wherein said pair of walking paths configured to allow a pet to walk through the interior volume from said hole, such that said plurality of elongated grooming elements contact a top side, a left side, a right side, and an underside of said pet as it traverses therethrough.

5. The device of claim 4, wherein said tunnel first and second surface further comprise abrasive material such that said animal may file down its claws as it passes through or climbs onto said device.

* * * * *